US006969836B2

(12) United States Patent
Cross et al.

(10) Patent No.: US 6,969,836 B2
(45) Date of Patent: Nov. 29, 2005

(54) SPACE CARVING FOR MEASUREMENT OF HIGH-CURVATURE AREAS ON A MECHANICAL PART

(75) Inventors: Geoffrey Mark Cross, Oxford (GB); Peter Henry Tu, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 247 days.

(21) Appl. No.: 10/065,510

(22) Filed: Oct. 25, 2002

(65) Prior Publication Data

US 2004/0079907 A1 Apr. 29, 2004

(51) Int. Cl.$^7$ .............................................. H01L 27/00

(52) U.S. Cl. .................... 250/208.1; 356/613; 356/388; 382/131; 250/559.36

(58) Field of Search ......................... 250/208.1, 559.22, 250/559.27, 559.36; 356/388–391; 382/131, 154, 203, 204

(56) References Cited

U.S. PATENT DOCUMENTS

| | | | | |
|---|---|---|---|---|
| 4,877,940 A | * | 10/1989 | Bangs et al. ........... | 219/124.34 |
| 5,864,640 A | * | 1/1999 | Miramonti et al. .......... | 382/312 |
| 2002/0145103 A1 | * | 10/2002 | Bernardini et al. ...... | 250/208.1 |

OTHER PUBLICATIONS

Andrew W. Fitzgibbon, G. Cross and A. Zisserman. "Automatic 3D Model Construction For Turn–Table Sequences", in L. Van Gool and R. Koch, editors, Structure and Motion from Multiple Images in Large–Scale Environments, lecture notes in Computer Science, Spring 1998.

Kutulakos, K. N., et al., "A Theory of Shape by Space Carving", Computer Vision, 1999. The Proceedings of The Seventh IEEE International Conference of Kerkyra, Greece Sep. 20–27, 1999, Los Alamitos, CA, USA, IEEE Comput. Soc, US Sep. 20, 1999 pp 307–314

Search Report.

* cited by examiner

Primary Examiner—Stephone B. Allen
(74) Attorney, Agent, or Firm—Jean K. Testa; Patrick K. Patnode

(57) ABSTRACT

A method of determining the leading edge (E) of a turbine blade or airfoil (P). The object is mounted in a desired position and backlit using a light source (S). The object and its leading edge are viewed using one or more cameras (I) which are positioned on the opposite side of the part. When illuminated, the object blocks a portion of the light from the source and the occluded portion of the light defines an outline (T) of the object including its leading edge. An image of the object is obtained and the part is then moved to other positions at which additional images are obtained. The images are processed using a space carving algorithm to ascertain the contour of the leading edge of the object. This allows accurate measurements of the leading edge to be made for using in determining acceptability of the part.

11 Claims, 2 Drawing Sheets

SPACE CARVING FOR MEASUREMENT OF HIGH-CURVATURE AREAS ON A MECHANICAL PART

BACKGROUND OF INVENTION

The present invention is directed to light gauging techniques for locating the leading edge of part such as turbine blade having a complex part shape. Accurately identifying the contour of the leading edge is important because many performance characteristics of the blade are determined by the shape of its leading edge. However, because of the complexity of the blades contour obtaining accurate measurements can be both difficult and time consuming. For example, it possible to hard gauge the contour of the blade using touch probes and other contact instruments. This, however, is time consuming and adds substantial cost to a production line process.

An alternative testing method involves light gauging techniques. For example, it is possible to measure the shape of an object by mounting it on a fixture and illuminating it with a structured laser light. That is, a laser light is directed at the surface of the object and a pattern of light stripes are produced which extend across the surface of the object generally parallel to each other. The path of the stripes varies in accordance with the shape features of the part. By rotating the part, a series of images can be obtained and processed using appropriate algorithms employing known triangulation techniques. Processing of the images allows the points to be located in three dimensional (3D) space.

If the part has relatively flat contours, or if curvatures in the contours are not very pronounced, the above procedure works well. However, for an airfoil such as a turbine blade, the shape of its leading edge is relatively complex and it has been found that it is difficult to accurately define the leading edge shape using the above described technique. A technique known as "space carving" has heretofore been used to create realistic 3D models from real objects. See, for example, *Automatic 3D Model Construction for Turn-Table Sequences*, Fitzgibbon et al., Robotics Research Group, Department of Engineering Science, University of Oxford (publication date). While the previous usage of space carving techniques has been the replication of whole objects, the present invention is directed not at replicating the overall shape of a turbine blade, rather at accurately determining only the shape of the leading edge so-that accurate comparisons between the blade's contour and a set of acceptance criteria for the part.

SUMMARY OF INVENTION

Briefly stated, the present invention is directed to determining the contour of the leading edge of a part such as a turbine blade having a complex part shape. The part is mounted on a fixture and a camera located a known distance from the objected is used to obtain an image of the object. The object is backlit so the outer contour of the object occludes a portion of the light and a silhouette of the part is created. Next, the object is rotated and a new image is obtained with a different part silhouette. This process is repeated until a sufficient number of images are acquired. The images are now processed using space carving techniques so the contour of the leading edge of the part is defined.

In an alternate embodiment, the blade is mounted on a fixture with a number of cameras located known distances from the part at defined orientations with respect to the part. The part is again backlit. An image of the blade is obtained from each camera. The images are processed using space carving techniques to obtain a contour of the leading edge of the part.

The foregoing and other objects, features, and advantages of the invention as well as presently preferred embodiments thereof will become more apparent from the reading of the following description in connection with the accompanying drawings.

BRIEF DESCRIPTION OF DRAWINGS

In the accompanying drawings which form part of the specification.

Corresponding reference numerals indicate corresponding parts throughout the several figures of the drawings.

DETAILED DESCRIPTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
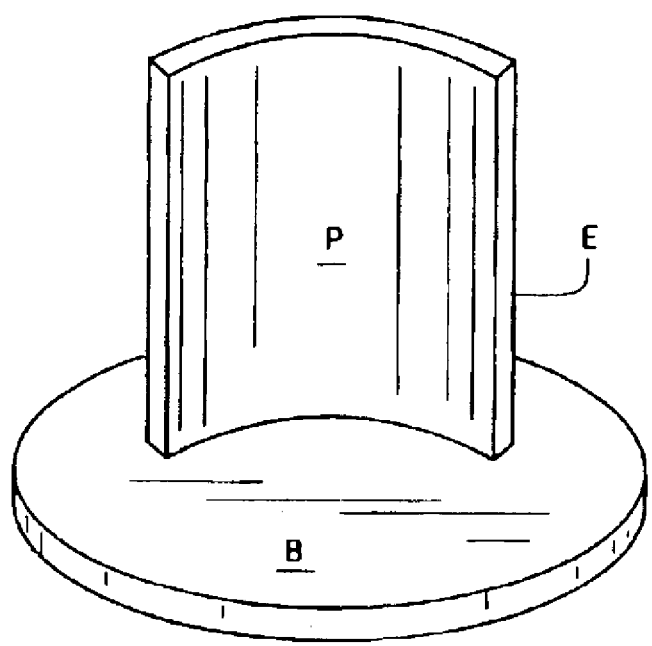
FIG. 1 is a representation of an object such as an airfoil having a complex part contour and the shape of whose leading edge is to be determined; and, FIG. 2 illustrates a test setup for obtaining images of the airfoil for processing using space carving techniques to determine the shape of the leading edge; and, FIGS. 3A–3C illustrate respective contours obtained of the image when backlit by a light source.

Referring to FIG. 1, a part P such as a turbine blade or airfoil is mounted on a fixture B. The airfoil has a complex three-dimensional part shape. When in use, performance characteristics of the blade are significantly determined by the contour of a leading edge E of the airfoil. As previously noted, the contour of the leading edge can be accurately determined using hard gauging techniques, but this costly and time consuming. Accordingly, use of a light gauging technique, particularly space carving, in accordance with the present invention provides a rapid method of accurately acquiring dimensional information about the part. Once this information is obtained, it is compared against that for a model of the part to determine whether the part is acceptable or must be rejected.

Figure 3A:
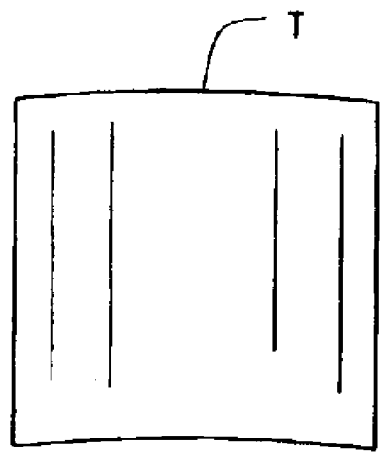

In accordance with the method of the invention, the airfoil is backlit by a light source S. The source projects light rays which produce a visual cone C of light. The outer contour T (see FIG. 3A) of part P occludes a portion of the projected light if viewed from the opposite, front side of the airfoil. If the part is viewed from different viewing angles, a series of occluded images can be made. By processing these images using a space carving algorithm, in accordance with the invention, an accurate approximation of the leading edge of the part can be developed. By then comparing the resulting leading edge values with those for a parametric model of the part, acceptability of the airfoil is readily determined.

Figure 2:
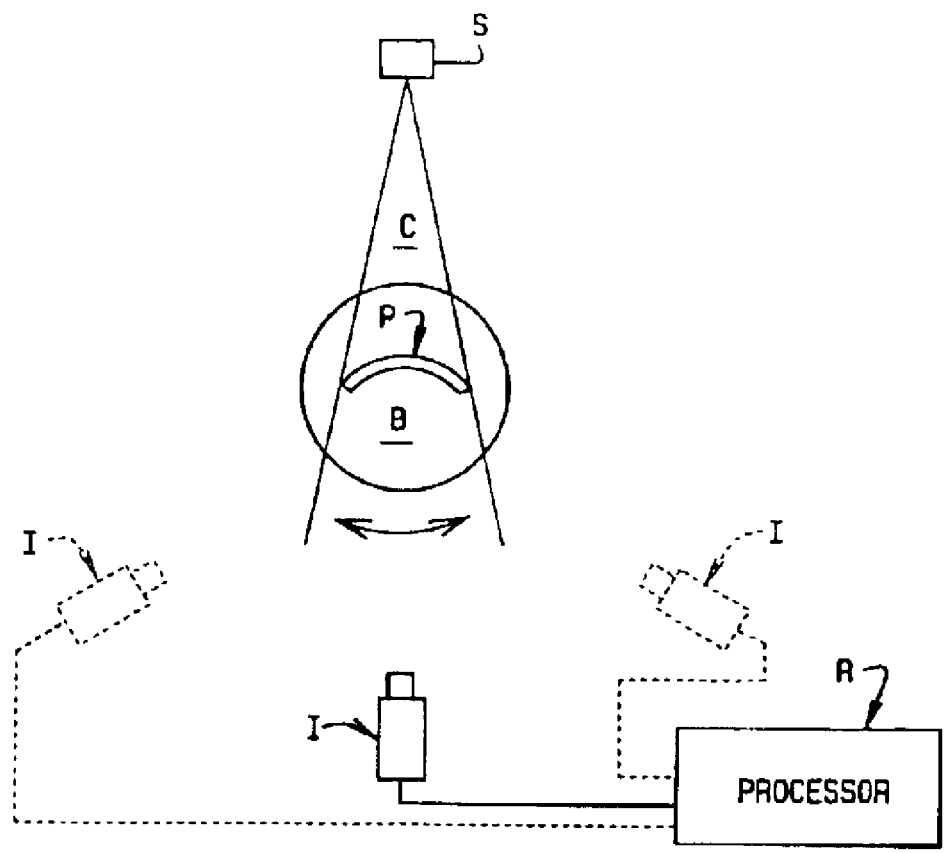

Referring to FIG. 2, part P is, as noted, mounted on a fixture B, which is preferably a movable fixture by which the airfoil can be placed in a desired orientation. Light source S is placed on one side of the part, and an imaging means I is placed-on the opposite side of the part so the part is between the light source and imaging means. As result, the part blocks a portion of the light emanating from the source, and the occluded light produces the outline or contour T of the part. With the arrangement shown in FIG. 2, a first image of the part is obtained by imaging means I which is preferably a camera operating in the visual portion of the light spectrum. This is the image shown in FIG. 3A. The image is supplied to a processor R for processing and analysis.

Figure 3B:
Figure 3C:

After the first image is obtained, fixture B is moved to position the part in a second preferred orientation. When in this new position, a new image of the part is taken by the imaging means. Because the part has been moved, a new contour, indicated T' in FIG. 3B is captured by the camera and provided to processor R for imaging. Fixture B is again moved to position the part in another preferred orientation, and another image of the backlit part is captured by the imaging means. This image shows yet another contour T" as indicated in FIG. 3C. This third image is also directed to processor R for processing.

The above steps are repeated until a sufficient number of images are obtained for processing so that the leading edge E of the part can be adequately defined using the space carving algorithm employed by processor R. Typically, three images are the minimum number sufficient for this purpose; although, 6–7, or up to 10 images may be required depending upon the complexity of the contour of the leading edge. Once the requisite number of images is obtained, processor R will produce a resultant image which is an accurate representation of the part's leading edge E which is then used for part acceptance purposes. Since acceptance leading edge characteristics of the part can be conveniently stored in the processor, the processor can make the acceptance determination as part of its image processing.

Referring again to FIG. 2, an alternate embodiment of the method of the present invention is also shown. Now, instead of one camera, imaging means I includes a plurality of cameras such as the three cameras shown in the FIG. (one solid line, and two in phantom). Each camera is generally positioned on the same side of the object (i.e, on the opposite side from the light source) with respect to part P so to have a defined orientation with respect to the part. Now, each camera captures a separate image of the part, which, for example, corresponds to the representations shown in FIGS. 3A–3C. The images are each supplied to processor R for processing in accordance with the space carving algorithm employed by the processor.

While three cameras I are shown in FIG. 2, as previously noted with to the number of images needed to obtain an accurate representation of the leading edge of the part, imaging means I may employ additional cameras. Each camera is positioned with respect to the part so to capture an appropriate image for processing.

Finally, it is a feature of the invention for processor R to retain the leading edge information developed for each part tested. This information can then be used to perform statistical analyses or provide other information useful in the design, manufacturing, and testing of the part.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method of determining the leading edge (E) of an object (P) comprising:

mounting the object (P) in a desired position;

positioning a light source (S) on one side of the object and viewing the object and its leading edge with an imaging means (I) positioned on the opposite side of the object;

illuminating the object (P) with the light source (S), the object blocking a portion of the light from the light source (S) and the occluded portion of the light defining an outline (T) of the object including its leading edge (E);

obtaining an image of the object (P) with the imaging means (I);

moving the object (P) to a new position and repeating the above steps of illuminating the object (P) and obtaining an image of the object with the imaging means;

processing the images using space carving techniques to ascertain the contour of the leading edge of the object whereby an accurate measurement of the leading edge can be made; and comparing the leading edge measurement of the object (P) with a reference to determine whether or not the object is an acceptable object.

2. The method of claim 1 in which at least three separate images of the object (P) are obtained and processed in order to determine the contour of the leading edge.

3. The method of claim 1 in which the object (P) is installed on a movable fixture (B) to orient the object in a desired position relative to the light source (S) and imaging means (I).

4. The method of claim 1 further including using a plurality of imaging means (I) spaced apart from one another on the same side of the object;

obtaining a separate image of the object (P) from each imaging means (I); and, processing the respective images using space carving techniques to ascertain the contour of the leading edge (E) of the object whereby an accurate measurement of the leading edge can be made.

5. The method of claim 4 in which the imaging means (I) comprises cameras and at least three cameras are used.

6. A method of determining the leading edge (E) of an object (P) comprising:

mounting the object (P) in a desired position;

positioning a light source (S) on one side of the object and a plurality of imaging means (I) on the opposite side of the object;

illuminating the object (P) with the light source (S), the object (P) blocking a portion of the light from the light source (S) with the occluded portion of the light defining an outline (T) of the object (P) including its leading edge (E);

obtaining an image of the object (P) with each of the respective imaging means (I);

processing the respective images using space carving techniques to ascertain the contour (T) of the leading edge (E) of the object (P) whereby an accurate measurement of the leading edge (E) can be made; and comparing the leading edge (E) measurements of the object (P) with a reference to determine whether or not the object is an acceptable object.

7. The method of claim 6 wherein the imaging means (I) includes at least three cameras.

8. Apparatus for determining the leading edge (E) of an object (P) comprising:

a (B) fixture on which the object (P) is mounted;

a light source (S) positioned on one side of the object (P);

a camera (I) positioned on the opposite of the object (P) for obtaining an image of the object (P) and its leading edge (E), the light source (S) illuminating the object which blocks a portion of the light from the light source (S) with the occluded portion of the light defining an outline (T) of the object (P) including its leading edge (E), and the object (P) being sequentially moved to new positions at each of which an image of the outline (T) of the object (P) including its leading edge (E) is obtained; and, a processor (R) processing the respective images using space carving techniques to ascertain the contour of the leading edge of the airfoil whereby an accurate measurement of the leading edge of the airfoil can be made, wherein the processor (R) compares the leading edge measurements of the airfoil (P) with a reference to determine whether or not the airfoil is an acceptable object.

9. The apparatus of claim 8 in which the fixture is a movable fixture used to position the airfoil in desired positions.

10. The apparatus of claim 9 further including a plurality of cameras (I) spaced apart from one another on the same side of the object, each camera obtaining a separate image of the object (P), the respective images being processed using space carving techniques to ascertain the contour of the leading edge (E) of the object whereby an accurate measurement of the leading edge can be made.

11. Apparatus for determining the leading edge (E) of an object (P) comprising:

a (B) fixture on which the object (P) is mounted;

a light source (S) positioned on one side of the object (P);

a plurality of cameras (I) positioned on the opposite of the object (P) in a spaced apart relationship for obtaining a respective image of the object (P) and its leading edge (E), the light source (S) illuminating the object which blocks a portion of the light from the light source (S) with the occluded portion of the light defining an outline (T) of the object (P) including its leading edge (E); and, a processor (R) processing the respective images using space carving techniques to ascertain the contour of the leading edge of the airfoil whereby an accurate measurement of the leading edge of the airfoil can be made, wherein the processor (R) compares the leading edge measurements of the airfoil (P) with a reference to determine whether or not the airfoil is an acceptable object.

* * * * *